United States Patent Office 3,516,835
Patented June 23, 1970

3,516,835
COATING COMPOSITIONS COMPRISING ALPHA-SULFO LOWER ALKYL ESTER OF A $C_7$ TO $C_{18}$ FATTY ACID
E. Scudder Mackey, Binghamton, N.Y., and Raymond L. Mayhew, Summit, and George M. Gantz, Upper Saddle River, N.J., assignors to GAF Corporation, New York, N.Y., a corporation of Delaware
No Drawing. Filed Oct. 29, 1965, Ser. No. 505,738
Int. Cl. G03c 1/38
U.S. Cl. 96—114.5
13 Claims

ABSTRACT OF THE DISCLOSURE

Coating compositions, suitable for use in light-sensitive photographic elements, which comprise a water-permeable colloid, e.g., gelatin, and as a coating aid, a small amount of at least one alpha-sulfo lower alkyl ester of a fatty acid having from 7 to 18 carbon atoms.

This invention relates to coating compositions comprising a water-permeable colloid and more particularly, to gelatin coating compositions advantageously adapted for use in connection with high-speed coating methods.

As is commonly recognized in the coatings industry, it is highly desirable, if not essential, that water-permeable colloid, e.g., gelatin, containing coating compositions be capable of application at relatively high coating speeds, and that the layers so deposited be of uniform and selected physical characteristics. The foregoing requirements are of primary import in operations associated with the preparation of photographic film elements. Ideally, coating aids contemplated for use in water-permeable colloid-containing compositions and especially those containing gelatin should:

(1) Be of uniform quality, properties, etc. from batch to batch;
(2) Enable the use of high-speed coating operations both in wet-on-wet and wet-on-dry coatings;
(3) Be devoid of any tendency to impart streakiness or repellency to the water-permeable colloid;
(4) Exhibit minimal sludge and/or foam formation;
(5) Produce coatings having little or no tendency to slip;
(6) Be non-photoactive Heretofore, considerable difficulty has been encountered in connection with attempts to provide water-permeable colloid layers of the desired characteristics while utilizing coating speeds which are consonant with feasible commercial operation and satisfactory product throughput. With gelatin compositions for example, and to which no auxiliary coating aid has been added, there are invariably obtained coated layers which exhibit manifold defects including, e.g., the presence of numerous crescent-shaped uncoated areas, also referred to as repellency spots, such defects approximating the size of a pinhead with streaks or other such irregularities emanating from the points of the crescent and proceeding in a direction opposite to that of the coating. It is not unusual to find that lightly coated areas of 5–10 mm. in diameter will result.

In an effort to overcome or otherwise mitigate the foregoing and related disadvantages, the art has resorted to the use of a variety of coating aids. Saponin for example, despite its relatively wide-spread use as a coating aid in gelatin compositions of various types has nevertheless proved somewhat unsatisfactory. Although yielding a relatively uniform and even coating, this material being of natural origin, may often vary markedly from batch to batch in quality, composition, purity and the like, to the extent that one or more of the properties required in the photographic emulsion may be deleteriously affected.

As a consequence, considerable attention has been focused on the use of synthetic coating aids selected from a wide variety of surfactant materials of the anionic, cationic and/or non-ionic types; including for example, the taurides, betaines, imidazolinium salts, and the like. Since materials of the latter type may be subjected to relatively precise conditions of manufacture, problems associated with variations in quality, composition, purity and the like are substantially eliminated. Despite the foregoing advantage, however, the synthetic coating aids heretofore provided have nevertheless proved unsatisfactory in a number of important respects. As examples of the more important difficulties repeatedly encountered with the use of the latter materials and especially in connection with the preparation of photographic layers containing gelatin, there may be mentioned their tendency to produce streakiness and repellency spots that cannot be readily rewet with the consequent condition that the product tends to form "air-bells" on the emulsion surface during photographic processing. Such areas will often manifest themselves in the form of relatively small, undeveloped areas in the processed product due to the fact that in such arean the developer is incapable of penetrating into the emulsion layer. These defects are not only unsightly to the extent that retouching of the negative is often required, but more importantly, can be dangerously misleading when present on certain types of films particularly medical or industrial X-Ray films.

The foregoing and related problems become increasingly manifest in connection with "wet-on-wet" coating methods wherein the water-permeable colloid composition is applied to a wet substrate. The latter is, of course, a matter of prime commercial importance and especially in connection with plural coating operations wherein it is of utmost importance to eliminate any necessity for drying and thus the time which would otherwise be consumed thereby.

However, with the use of the coating aids heretofore provided, the "one pass-wet-on-wet" technique is found to be substantially inapplicable and accordingly, it becomes necessary to dry an applied layer prior to the application of an additional overcoating layer.

Thus, a primary object of the present invention resides in the provision of improved water-permeable colloid containing coating compositions which are substantially devoid of the above disadvantages.

Another object of the present invention resides in the provision of improved gelatin coating compositions advantageously adapted for application via the use of high speed coating techniques.

A further object of the present invention resides in the provision of coating aids for use with photosensitive gelatin emulsion compositions to facilitate the attainment of coatings which are uniform and repellency-free without deleteriously affecting the emulsion.

Other and related objects of the present invention will become apparent hereinafter as the description thereof proceeds.

The attainment of the foregoing and related objects is made possible in accordance with the present invention which, in its broader aspects includes the provision of improved water-permeable colloid compositions containing as an essential ingredient at least one alpha-sulfo substituted lower alkyl ester of a $C_7$ to $C_{18}$ fatty acid. The hydrocarbon portion of the fatty acid moiety may be either saturated or unsaturated, i.e., contain one or more unsaturated carbon-to-carbon linkages. The term "sulfo" as used in the present invention is to be understood as encompassing both the free acid, i.e., alpha-sulfonic acid derivatives as well as water-soluble salts thereof, i.e., the alpha-sulfonate derivatives. As examples of suitable water-soluble salt forming cations, there may be mentioned the alkali metals, e.g., sodium, potassium, etc.; ammonium; substituted ammonium in which one or more of the hydrogens is replaced by lower alkyl, e.g., methyl, ethyl, etc. hydroxy lower alkyl e.g., hydroxyethyl, and wherein such substituents may be the same or different.

The improvements provided by the present invention are particularly manifest with the use of methyl myristate alpha-sodium sulfonate. The latter compound is available commercially from the Stepan Chemical Company under the trade name designation Bio-Det-M-100. Coating compositions containing this compound are eminently suited for application via the "one-pass-wet-on-wet" coating technique utilizing higher coating speeds and especially when employed in combination with one or more different surfactant materials thereby realizing greater product throughput per unit of production time leading to substantial savings.

Although specific reference will be made to gelatin throughout the present description, the term water-permeable colloid as used herein is to be understood as encompassing water-soluble and/or dispersible materials whose aqueous solutions yield water-permeable films on drying. As examples of substances coming within this definition there may be mentioned in particular and without limitation water-soluble cellulose esters of lactic or glycolic acid, partially hydrolyzed polyvinyl acetate, modified polyvinyl alcohol, water-soluble polyvinyl acetals, etc. The colloid may also be suitably provided in the form of an aqueous dispersion, emulsion, suspension, etc., such as would be the case with polymers derived from the polymerization of one or more acrylate monomers, e.g., ethyl acrylate, methyl methacrylate, etc. The foregoing materials are conventionally provided in latex form by the use of suitable emulsifying agents, suspending agents or the like.

In accordance with the discovery forming the basis of the present invention, it has been ascertained that the improvements provided by the aforedescribed coating aids are obtained even though employed in relatively small quantities, i.e., on the order of 0.01% and lower by weight based on the weight of the coating solution. It should be understood, of course, that larger quantities may be employed to advantage, for example, in amounts ranging up to 1.0% and even 1% by weight based on the weight of the coating solution. The particular proportions employed will, of course, depend primarily on the ultimate use contemplated for the coating composition in question. Accordingly, the aforementioned concentrations are not particularly critical but serve only to define those proportions found to yield, in general, optimum results. For example, in those instances wherein the gelatin is to be incorporated directly into a photographic silver halide emulsion, the gelatin concentration will ordinarily range from about 2 to about 10% by weight of the emulsion composition with a range of 6 to 8% being preferred. Accordingly, the amount of alpha-sulfo fatty acid ester employed will ordinarily correspond to a preferred range of from about 0.1% to about 5% by weight based on the dry weight of the colloidal carrier material, e.g., gelatin. Expressed in terms of coated area, the effective amounts of coating aids for use herein range from about 1 to about 50 milligrams per sq. ft. since 1 kilogram of gelatin, dry basis, will usually provide coverage for about 1,000 sq. ft. of surface.

The photographic emulsions prepared utilizing the coating aids of the present invention will ordinarily be comprised of an aqueous solution of gelatin containing as the light-sensitive material a silver salt such as silver bromide, silver chloride, silver iodide as well as mixtures thereof. Such emulsions may be of the nonoptically sensitized, orthochromatic, panchromatic or X-Ray type. When preparing the photographic emulsion, the coating aids may be included either before or after the addition of any of the other ingredients conventionally employed in gelatin-silver halide emulsions, e.g., sensitizing dyes, hardeners, etc. The particular coating procedure employed may comprise any of the standard methods well established in the coatings industry. For example, the substrate to be coated may be passed through a trough or other reservoir containing the coating solution. The coating may be applied in greater thickness than desired ultimately and thereafter subjected to the action of some leveling means such as a doctor blade or an air-brush which causes runback of the coating compositions thereby resulting in the obtention of an even surface. In some instances, the coating method may involve a hopper technique in which the thickness of the layer is regulated by the rate at which the coating composition is deposited upon the base which is transported in a direction adjacent thereto.

The following example is given for purposes of illustrating the present invention and is not to be considered as being limitative thereof.

EXAMPLE

With each of the following samples, the coating composition comprises a gelatin-silver halide photographic emulsion having a silver concentration of approximately 35 grams per kilogram of emulsion and a gelatin concentration of approximately 70 grams per kilogram of emulsion. Sample B is prepared by adding approximately 1 gram of saponin to a sample of the foregoing emulsion while sample C is prepared by adding approximately 0.5 gram of methyl myristate alpha-sodium sulfonate to a sample of the aforedescribed emulsion. Each of the emulsion samples is coated onto a cellulose acetate support via the air doctor blade technique employing a coating speed of approximately 60 ft. per minute, to yield in each case a coating having a surface concentration of emulsion of about 6 grams per sq. meter. In each case, the coating was chilled and allowed to set. The results obtained are tabulated as follows: (The term repellency refers to the number of uncoated spots per 3 sq. ft. of coating area)

| Sample | Coating aid | Conc. of coating aid per unit of coating solution, percent | Repellencies |
|---|---|---|---|
| A | Control | | Gross, 10 |
| B | Saponin | 0.10 | 3 |
| C | Methyl myristate alpha-sodium sulfonate | 0.05 | None |

As the above results clearly demonstrate gelatino-silver halide emulsions containing the coating aids of the present invention exhibit a marked improvement in the reduction of coating irregularities when compared to emulsions based on the use of saponin as well as emulsions containing no coating aid at all. With reference to Sample C, it will be noted that the use of methyl myristate alpha-sodium sulfonate yields an emulsion composition completely devoid of repellencies. Moreover, the photographic properties characterizing Sample C were found to be excellent and neither fog nor loss of speed was observed therewith.

When the above example is repeated by utilizing the following coating aids methyl laurate alpha-sodium sulfonate
methyl myristate alpha-sodium sulfonate
methyl palmitate alpha-sodium sulfonate
methyl caprylate alpha-sodium sulfonate
methyl stearate alpha-sodium sulfonate
methyl myristate alpha-ammonium sulfonate
methyl myristate alpha-diethanol amine sulfonate
methyl myristate alpha-triethanol amine sulfonate in proportions ranging from as little as about 0.1% up to about 5% by weight based on the dry weight of the gelatin, similar improvement is obtained. In each case, the coating was found to be uniform and free of repellency spots, mottle, streakiness and the like.

Improvements similar to those described above are further obtained when the gelatin carrier is replaced wholly or partly with one or more other water-permeable colloids such as the water-soluble cellulose esters of lactic or glycolic acid, partially hydrolyzed polyvinyl acetate, modified polyvinyl alcohol, water-soluble acetals, etc.

In addition, it is found that gelatin coating compositions containing conventional coating aids of the type heretofore provided such as the taurides, protein condensation products of fatty acids, saponin, polyoxyethylene derivatives of long chain fatty acids, alcohols, etc., may be synergistically modified to advantage by including one or more of the coating aids provided by the present invention. Moreover, in lieu of saponin, other suitable surface active agents may be added such as sulfated oleic acid, dihexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid, and sulfonates of high molecular weight primary or secondary aliphatic, aromatic and cycloaliphatic carboxy acids.

In addition, the improvements provided by the present invention are also obtained with silver halide emulsions which contain color formers which are provided with a solubilizing sulfo or carboxy group, and therefore, soluble in alkali solutions, for instance, sodium hydroxide solutions. Such color formers which upon color development with a primary amino developer yield azomethine, quinonimine or azine dyes, are described in U.S. Pats. 2,186,734; 2,445,252; 2,530,349; 2,671,021; 2,524,725; 2,354,552 and 2,547,037.

Furthermore, the color coupler may be of the non-diffusing type which, when added to the silver halide emulsion dispersed in a mixture of high boiling and low boiling solvents, forms packet-type emulsions with capsulated color formers. Such color formers are known to persons skilled in the art. Typical representatives are described in U.S. Pats. 2,186,852; 2,179,239; 2,179,244; 2,298,443; 2,369,489 and 2,511,231.

Although the present invention has been particularly described with reference to the preparation of photographic silver halide emulsions, it will be understood that the coating compositions provided by the present invention may comprise simply a mixture of gelatin with one or more of the alpha-sulfo fatty acid ester coating aids. Such compositions find utility in a wide variety of applications and may be applied as such to any number of substrate materials for purposes of providing a suitable overcoat. For example, they may be employed to advantage as protective coatings for paper, plastics such as films of cellulose nitrate, cellulose esters, e.g., cellulose acetate, cellulose acetate butyrate and the like. In addition, they may be applied in the form of antihalation layers, antistatic layers, filter layers or in any type of gelatin layer which is coated from a composition consisting essentially of an aqueou solution of gelatin. For example, gelatin coating compositions intended for use as auxiliary layers, surface layers, etc., will usually contain the gelatin in amounts approximating 2–3% by weight of the total composition. However, when employed in the preparation of photographic emulsions, it is usually advisable to employ larger proportions of coating aid than would customarily be employed in aqueous solutions of gelatin intended for use as simple overcoatings. Moreover, in some instances, it may be advantageous to employ larger proportions even though the coating composition in question is intended for use as a simple auxiliary, i.e., non-photographic layer. For example, larger proportions of coating aid are found to permit the more effective use of higher coating speeds. In general, increased proportions of coating aid are usually desirable where the gelatin is employed in minor concentrations. The pH of the coating composition would ordinarily fall within a range of about 5 to 8. For example, when utilizing the coating compositions described herein as auxiliary layers, e.g., as a non-curling layer in a photographic film element, an acid pH range is usually preferred. In such instances, the alpha-sulfo fatty acid ester is more effectively employed in the form of its sulfonic acid derivative.

This invention has been described with respect to certain preferred embodiments and there will become obvious to persons skilled in the art other variations, modifications, and equivalents which are to be understood as coming within the scope of the present invention.

We claim:
1. A coating composition comprising a water-permeable colloid and a coating aid therein comprising a relatively small amount not exceeding 1% by weight of the coating composition of at least one alpha-sulfo lower alkyl ester of a $C_7$ to $C_{18}$ fatty acid wherein the alpha-sulfo substituent is a member selected from the group consisting of the free acid and a water-soluble salt thereof.

2. A composition according to claim 1 wherein said coating aid comprises the sodium salt of alpha-sulfo methyl myristate.

3. A composition according to claim 1 wherein said coating aid is present in amounts ranging from 0.01% to 1% by weight of the coating composition.

4. An article of manufacture comprising a support coated with the composition of claim 1.

5. An article of manufacture according to claim 4 wherein said base comprises cellulose acetate.

6. A photographic silver halide emulsion containing therein as a coating aid a relatively small amount not exceeding 1% by weight of a coating composition as described in claim 1 of at least one alpha-sulfo lower alkyl ester of a $C_7$ to $C_{18}$ fatty acid wherein the alpha-sulfo substituent is a member selected from the group consisting of the free acid and a water-soluble salt thereof.

7. A photographic emulsion according to claim 6 wherein said coating aid comprises the sodium salt of alpha-sulfo methyl myristate.

8. A photographic emulsion according to claim 6 wherein said coating aid is present in amounts ranging from 0.01% to 1% by weight of a coating composition comprising a water-permeable colloid and the coating aid.

9. A multi-layer, light-sensitive photographic silver halide element wherein at least one layer comprises a water-permeable colloid containing therein a relatively small amount not exceeding 5% by weight of the water-permeable colloid of at least one alpha-sulfo lower alkyl ester of a $C_7$ to $C_{18}$ fatty acid wherein the alpha-sulfo substituent is a member selected from the group consisting of the free acid and a water-soluble salt thereof.

10. A photographic element according to claim 9 wherein said coating aid comprises the sodium salt of alpha-sulfo methyl myristate.

11. A photographic element according to claim 9 wherein said coating aid is present in amounts ranging from 0.01% to 1% by weight of a coating composition comprising a water-permeable colloid and the coating aid.

12. A photographic element according to claim 9 wherein at least one of said layers containing the said fatty acid coating aid is a light-sensitive silver halide emulsion layer.

13. A photographic element according to claim 9 wherein at least one of said layers containing the said fatty acid coating aid is a non-light-sensitive layer.

References Cited

UNITED STATES PATENTS

| | | | |
|---|---|---|---|
| 1,822,977 | 9/1931 | Münz | 252—354 |
| 2,831,766 | 4/1958 | Knox et al. | 96—94 |
| 3,128,294 | 4/1964 | Stirton et al. | 252—354 |
| 3,219,584 | 11/1965 | Stirton et al. | 252—354 |
| 2,460,968 | 2/1949 | Bert et al. | 260—400 |
| 3,413,221 | 11/1968 | Gotte et al. | 252—138 |

OTHER REFERENCES

Glatkides, Pierre, Photographic Chemistry, vol. I, 1958, pp. 383, 384.

NORMAN G. TORCHIN, Primary Examiner

MARY T. KELLEY, Assistant Examiner

U.S. Cl. X.R.

106—125